United States Patent
Nishimura

[11] Patent Number: 6,057,395
[45] Date of Patent: May 2, 2000

[54] RUBBER COMPOSITION LOWERED IN HEAT BUILD-UP

[75] Inventor: Koichi Nishimura, Yokohama, Japan

[73] Assignee: Nippon Zeon Co., Ltd., Tokyo, Japan

[21] Appl. No.: 09/117,395

[22] PCT Filed: Jan. 31, 1997

[86] PCT No.: PCT/JP97/00235

§ 371 Date: Jul. 29, 1998

§ 102(e) Date: Jul. 29, 1998

[87] PCT Pub. No.: WO97/28217

PCT Pub. Date: Aug. 7, 1997

[30] Foreign Application Priority Data

Jan. 31, 1996 [JP] Japan ................................. 8-037351
May 15, 1996 [JP] Japan ................................. 8-145200

[51] Int. Cl.⁷ ............................... C08J 5/10; C08K 3/18; C08K 3/22; C08L 9/02
[52] U.S. Cl. ........................ 524/433; 524/430; 524/397; 524/399
[58] Field of Search ................................ 525/274, 301; 524/430, 433, 397, 399

[56] References Cited

U.S. PATENT DOCUMENTS

| | | | |
|---|---|---|---|
| 3,800,032 | 3/1974 | Eberle et al. | 423/636 |
| 4,918,144 | 4/1990 | Fukuda | 525/263 |
| 4,960,847 | 10/1990 | Arai et al. | 528/32 |
| 5,756,586 | 5/1998 | Nishimura et al. | 525/301 |

FOREIGN PATENT DOCUMENTS

| | | |
|---|---|---|
| 53-85842 | 7/1978 | Japan . |
| 53-125139 | 11/1978 | Japan . |
| 1-306443 | 12/1989 | Japan . |
| 3-748 | 1/1991 | Japan . |
| 4-4240 | 1/1992 | Japan . |

*Primary Examiner*—James J. Seidleck
*Assistant Examiner*—U K Rajguru
*Attorney, Agent, or Firm*—Armstrong, Westerman, Hattori, McLeland & Naughton

[57] ABSTRACT

A rubber compostion having a reduced heat build-up, which comprises (a) 100 wt. parts of a elastomer capable of being crosslinked by an organic peroxide crosslinking agent, (b) 10–150 wt. parts of a metal salt of an α,β-ethylenically unsaturated carboxylic acid, (c) 5 to 100 wt. parts of magnesium oxide having a BET specific surface area not larger than 25 m²/g, and (d) 0.1 to 30 wt. parts of an organic peroxide crosslinking agent. A roll having an outer peripheral surface portion composed of a vulcanizate of the rubber compositon. The roll has high strenghts and reduced heat build-up, and is especially suitable for use under a high load.

21 Claims, No Drawings

RUBBER COMPOSITION LOWERED IN HEAT BUILD-UP

TECHNICAL FIELD

This invention relates to a rubber composition exhibiting a reduced heat build-up. More particularly, it relates to a rubber composition with a reduced heat build-up giving crosslinked products which are suitable for uses under a high load and for which a low heat build-up is required, especially rolls used under a high load such as, for example a steel-making roll and a paper-making roll. The invention further relates to a roll used under a high load and composed of a crosslinked product of the rubber composition.

BACKGROUND ART

It is known that vulcanizable rubber compositions comprising a nitrile group-containing highly saturated copolymer rubber having incorporated therein an organic peroxide and a zinc salt of an ethylenically unsaturated carboxylic acid give rubber materials having high strengths (For example, Japanese Unexamined Patent Publication [hereinafter abbreviated to "JP-A"] No. S63-270753 and JP-A H1-306443). These rubber materials are suitable for uses for which good weather resistance thermal resistance, strengths and oil resistance are required, such as various automobile transmission belts. However, they are often unsatisfactory in many other uses for which special characteristic performances are required.

It is also known that vulcanizable rubber compositions comprising rubbers, other than a nitrile group-containing highly saturated copolymer rubber, having incorporated therein an organic peroxide and a zinc salt of an ethylenically unsaturated carboxylic acid give rubber materials having high strengths. For example, JP-A S53-125139 discloses a rubber composition comprising poly-butadiene rubber having incorporated therein methacrylic acid, zinc oxide and an organic peroxide, and it is taught that a vulcanizate made therefrom is suitable for a solid golf ball. JP-A S53-85842 discloses a vulcanizate made from a composition comprising a diene rubber, methacrylic acid, zinc oxide, an organic peroxide and a non-polymerizable carboxylic acids which has a high tensile strength.

Rubber rolls used under a high load, such as, for example, steel-making rolls and paper-making rolls, have a problem such that a heat build-up occurs to a great extent when they are compressed or a shearing force is applied thereto. To solve this problem, it is considered to increase the hardness of rubber rolls. However, the increase of the rubber hardness results in deterioration of good rubber characteristics and occurrence at cracks on the surface of the rubber rolls.

The inventors have found that a vulcanizate made from a rubber having incorporated therein a zinc salt of an ethylenically unsaturated carboxylic acid exhibits a lower heat build-up than that of a vulcanizate made from a rubber having not incorporated therein the zinc carboxylate, if the two vulcanizates have a hardness of the same level. However, when a roll made of the rubber vulcanizate having incorporated therein a zinc salt of an ethylenically unsaturated carboxylic acid is used under severe conditions, it is not completely satisfactory.

It is known to use magnesium oxide as a vulcanizer for rubbers such as an acrylic rubber, a chloroprene rubber and a chlorinated polyethylene rubber, it is also known to incorporate zinc oxide in a rubber composition to enhance adhesion of the rubber composition to fiber or enhance thermal resistance of rubber parts made therefrom. As the magnesium oxide, soft-burned magnesia (burned at a relatively low temperature [i.e., not higher than 800° C.]) is generally used.

JP-A H3-748 discloses a rubber composition comprising an acrylonitrile-butadiene copolymer rubber having incorporated therein an $\alpha,\beta$-unsaturated carboxylic acid, and an oxide, hydroxide or carbonate salt of zinc and/or magnesium, and teaches that a vulcanizate thereof has good oil resistance and hardness. JP-A H4-4240 discloses a rubber composition comprising an acrylonitrile-butadiene copolymer rubber having a high acrylonitrile content and having incorporated therein an $\alpha,\beta$-unsaturated carboxylic acid, an oxide, hydroxide or carbonate salt of zinc and/or magnesium, and an organic peroxide, and teaches thaw a vulcanizate thereof has good oil resistance and permanent set. It is noted, however, that these documents do not specifically disclose any working example wherein an oxide, hydroxide or carbonate salt of magnesium is used, and do not disclose any details of the magnesium oxide referred to.

DISCLOSURE OF INVENTION

An object of the present invention is to provide a crosslinkable rubber composition giving a rubber material useful for a roll used under a high load, which is characterized as possessing high strengths and a reduced heat build-up.

The inventors have found that, when magnesium oxide having a small specific surface area and a large average particle diameter is incorporated in a crosslinkable rubber composition comprising a nitrile group-containing highly saturated copolymer rubber or other rubbers, an organic peroxide, and a zinc salt or other metal salt of an ethylenically unsaturated carboxylic acid, the blend results in a rubber material satisfying both high strengths and low heat build-up. Eased on this finding, the present invention has been completed.

In accordance with the present invention, there is provided a rubber composition exhibiting a reduced heat build-up, which comprises:

(a) 100 parts by weight of an elastomer capable of being crosslinked by an organic peroxide crosslinking agent, (b) 10 to 150 parts by weight of a metal salt of an $\alpha,\beta$-ethylenically unsaturated carboxylic acid, (c) 5 to 100 parts by weight of magnesium oxide having a BET specific surface area not larger than 25 $m^2/g$, and (d) 0.1 to 30 parts by weight of an organic peroxide crosslinking agent.

In accordance with the present invention, there is further provided a roll used under a high load, which is characterized in that at least surface portion of the roil is composed of a crosslinked product of the above-mentioned rubber composition.

Best Mode for Carrying Out the Invention

Elastomer Capable of Being Crosslinked by Organic Peroxide Crosslinking Agent The low heat build-up rubber composition of the present invention comprises as the fundamental rubber ingredient an elastomer capable of being crosslinked by an organic peroxide crosslinking agent. The elastomer used is not particularly limited provided that it is capable of being crosslinked by an organic peroxide crosslinking agent and of giving a vulcanizate having high strengths and a low heat build-up. As specific examples of the elastomer, there can be mentioned unsaturated nitrile-conjugated diene copolymer rubbers represented by an acrylonitrile-butadiene copolymer rubber (NBR) and hydrogenation products thereof; conjugated diene rubbers such as polybutadiene rubber (BR), polyisoprene rubber (IR) and natural rubber (NR); aromatic vinyl compound-conjugated diene copolymer rubbers such as a styrene-butadiene copolymer rubber (SBR); ethylene-α-olefin copolymer rubbers such as an ethylene-propylene copolymer rubber (EBR), an ethylene-propylene-diene copolymer rubber (EPDM); acrylic rubbers (ACM) including acrylic acid ester copolymer rubbers; and epichlorohydrin rubbers such as an epichlorohydrin-ethylene oxide-ally glycidyl ether copolymer rubber. These rubbers can be used alone or as a combination of at least two thereof.

The elastomer capable of being crosslinked by an organic peroxide crosslinking agent will be described in detail in the following.

(1) Unsaturated Nitrile-Conjugated Diene copolymer Rubber and Hydrogenation Products Thereof Among the elastomers capable of being crosslinked by an organic peroxide crosslinking agent, unsaturated nitrile-conjugated diene copolymer rubbers and hydrogenation products thereof are preferable because of good mechanical strength, reduced heat build-up, oil resistance and abrasion resistance. Especially a hydrogenation product (hereinafter referred to as "nitrile group-containing highly saturated copolymer rubber) of an unsaturated-conjugated diene copolymer rubber is best.

The nitrile group-containing highly saturated copolymer rubber is prepared by hydrogenating the conjugated diene portions of an unsaturated nitrile-conjugated diene copolymer, or of a copolymer of an unsaturated nitrile-conjugated diene-other copolymerizable monomer, and usually has a Mooney viscosity of 15 to 200, preferably 30 to 100, and an iodine value not larger than 80, preferably not larger than 40. If the Mooney viscosity is smaller than 15, the resulting rubber vulcanizate has a poor strength. In contrast, if the Mooney viscosity exceeds 200, the viscosity is undesirably increased and molding of the rubber composition becomes difficult.

The content of bound unsaturated nitrile units in the copolymer is usually in the range of 10 to 50% by weight, preferably 15 to 45% by weight. As specific examples of the unsaturated nitrile, there can be mentioned acrylonitrile, methacrylonitrile and α-chloroacrylonitrile, of these, acrylonitrile is preferable.

The content of conjugated diene units in the copolymer is usually in the range of 90 to 10% by weight, preferably 85 to 25% by weight. As specific examples of the conjugated diene, there can be mentioned 1,3-butadiene, 2,3-dimethylbutadiene, isoprene and 1,3-pentadiene, of these, 1,3-butadiene is preferable.

If desired, an unsaturated carboxylic acid ester or other copolymerizable monomers can be copolymerized with the unsaturated nitrile and the conjugated diene.

As specific example of the copolymerizable unsaturated carboxylic acid ester, there can be mentioned alkyl acrylates and methacrylates, the alkyl group of which has 1 to about 18 carbon atoms, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate;

alkoxyalkyl acrylates, the alkoxyalkyl group of which has 2 to about 12 carbon atoms, such as methoxymethyl acrylate, methoxyethyl acrylate, ethoxyethyl acrylate, butoxyethyl acrylate, ethoxypropyl acrylate, methylethoxy acrylate and ethoxybutoxy acrylate;

cyanoalkyl acrylates, the cyanoalkyl group of which has 2 to about 12 carbon atoms, such as α- and β-cyanoethyl acrylates, α-,β- and γ-cyanopropyl acrylates, cyanobutyl acrylate cyanohexyl acrylate and cyanobutyl acrylate;

hydroxyalkyl acrylates such as 2-hydroxyethyl acrylate and hydroxypropyl acrylate;

mono- and di-alkyl esters of unsaturated dicarboxylic acids such as monoethyl maleate, dimethyl maleate, dimethyl fumarate, diethyl fumarate, di-n-butyl fumarate di-2-ethyl-hexyl fumarate, dimethyl itaconate diethyl itaconate, di-n-butyl itaconate and di-2-ethylhexyl itaconate;

amino group-containing unsaturated carboxylic acid esters such as dimethylaminoethyl acrylate, diethylamino-ethyl acrylate, 3-(diethylamino)-2-hydroxypropyl acrylate and 2,3-bis(difluoroamino) propyl acrylate;

fluoroalkyl acrylates and fluoroalkyl methacrylates, such as trifluoroethyl acrylate, tetrafluropropyl acrylate, pentafluoropropyl acrylatep heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate t trifluoroethyl methacrylate, tetrafluropropyl methacrylate, octafluoro-pentyl methacrylate, dodecafluoroheptyl methacrylate, pentadecafluorooctyl methacrylate and heptadecafluorononyl methacrylate; and fluorine-substituted benzyl acrylates and methacrylates, such as fluorobenzyl acrylate, fluorobenzyl methacrylate and di fluorobenzyl dimethacrylate.

Of these unsaturated carboxylic acid esters, unsaturated dicarboxylic acid dialkyl esters are preferable.

The other copolymerizable monomers include, for example, vinyl monomers such as styrene, α-methylstyrene and vinylpyridine; non-conjugated diene monomers such as vinylnorbornene, dicyclopentadiene and 1,4-hexadiene; fluorine-containing vinyl monomers such as fluoroalkyl vinyl ethers including, for example, fluoroethyl vinyl ether, fluoro-propyl vinyl ether, trifluoromethyl vinyl ether, trifluoro-ethyl vinyl ether, perfluoropropyl vinyl ether and perfluorohexyl vinyl ether, o- or p-trifluoromethylstyrene, vinyl pentafluorobenzoate, difluoroethylene and tetrafluoroethylene; unsaturated monocarboxylic acids such as acrylic acid and methacrylic acid; unsaturated dicarboxylic acids such as itaconic acid, fumaric acid and maleic acid, and anhydrides thereof; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate, The amount of the unsaturated carboxylic acid ester monomer or the other copolymerizable monomer can be in the range of 0 to 80% by weight, preferably 0 to 60% by weight and more preferably 0 to 50% by weight, based on the total monomers.

The procedure for hydrogenating the unsaturated nitrile-conjugated diene copolymer or the copolymer of unsaturated nitrile-conjugated diene-other monomer is not particularly limited, and these copolymers can be hydrogenated by conventional procedures. As the catalyst used for the hydrogenation, there can be mentioned, for example, palladium/silica and palladium complex (see JP-A H3-252405). Rhodium compounds and ruthenium compounds described in, for example, JP-A S62-125858, JP-A S62-42937, JP-A H1-45402, JP-A H1-45403, JP-A H1-45404 and JP-A H1-45405 can also be mentioned.

The nitrile group-containing highly saturated copolymer rubber can also be made by directly hydrogenating a latex of the unsaturated nitrile-conjugated diene-unsaturated carboxylic acid ester copolymer. As examples of the methods for directly hydrogenating the copolymer latex, there can be mentioned a method using a palladium catalyst (for example, JP-A H2-176305), a method using a rhodium catalyst (for example, JP-A S59-115303, JP-A S56-133219 and U.S. Pat. No. 3,898,208), and a method using a ruthenium catalyst (for example JP-A H6-184223 and JP-A H6-192323), but the direct hydrogenation method is not particularly limited to these methods. In one specific example of the direct hydrogenation method using a palladium catalyst as described in JP-A H2-178305, an organic solvent capable of dissolving or swelling a nitrile group-containing unsaturated copolymer is incorporated in a latex of this copolymer. By this method, the nitrile group-containing unsaturated copolymer is swollen with the organic solvent and thus access of the hydrogenation catalyst to double bonds in the unsaturated copolymer is easily obtained, Therefore, a hydrogenation reaction can be conducted at high efficiency while the aqueous emulsion state is maintained.

The palladium compounds include various inorganic compounds, complex salts, and others. As specific examples of the palladium compound, there can be mentioned palladium salts of carboxylic acids such as formic acid, acetic acid, propionic acid, lauric acid, succinic acid, stearic acid, oleic acid, phthalic acid and benzoic acid; chlorinated palladium compounds such as palladium chloride, dichloro-(cyclooctadiene)palladium, dichloro(norbornadiene) palladium, dichloro(benzonitrile)palladiumr dichlorobis (triphenyl-phosphine)palladium, ammonium tetrachloropalladate(II) and ammonium hexachloropalladate (IV); palladium bromide; palladium iodide; palladium sulfate dihydrate; and potassium tetracyanopalladate(II) trihydrate. The palladium compounds are not limited to these compounds. Of these compounds, a palladium salt of carboxylic acids, dichloro(norbornadiene)-palladium and ammonium hexachloropalladate(IV) are especially preferable.

(2) Polybutadiene Rubber (BR)

Conventional polybutadiene rubbers can be used. Typical examples of the polybutadiene rubbers are the following two types (i) and (ii).

(i) Polybutadiene rubber having a cis-1,4 content of at least 90% and a Mooney viscosity of 20 to 90, which is prepared by polymerizing 1,3-butadiene monomer by using a coordination polymerization catalyst such as a cobalt-, nickel- or titanium-containing coordination polymerization catalyst.

(ii) Polybutadiene rubber having a 1,2-vinyl content of 10 to 60% and a Mooney viscosity of 20 to 90, which is prepared by polymerizing 1,3-butadiene monomer by using an anion polymerization catalyst such as a lithium-containing anion polymerization catalyst.

(3) Polyisoprene Rubber (IR) and Natural Rubber Conventional polyisoprene rubbers and natural rubber can be used. A typical example of the polyisoprene rubber is IR having a cis-1,4 content of at least 90% and a Mooney viscosity of 50 to 150, which is prepared by polymerizing isoprene monomer by using a Ziegler polymerization catalyst or a lithium-containing polymerization catalyst.

(4) Aromatic Vinyl Compound-Conjugated Diene Copolymer Rubber

This rubber is obtained by copolymerizing an aromatic vinyl compound such as styrene or α-methylstyrene with a conjugated diene such as 1,3-butadiene, isoprene, 2,3-dimethylbutadiene and 1,3-pentadiene, and preferably contains 10 to 50% by weight of an aromatic vinyl compound (preferably styrene) and has a Mooney viscosity of 30 to 150. A typical example of the aromatic vinyl compound-conjugated diene copolymer rubber is a styrene-butadiene copolymer rubber (SBR).

(5) Ethylene-α-Olefin Copolymer Rubber

The ethylene-α-olefin copolymer rubber is a copolymer of ethylene with α-olefin, or a copolymer of ethylene with α-olefin and a non-conjugated diene, and this copolymer rubber is of a substantially saturated structure. As examples of the ethylene-α-olefin copolymer rubber, there can be mentioned copolymer rubbers predominantly comprised of ethylene units and units of α-olefin having 3 to 14 carbon atoms such as an ethylene-propylene copolymer rubber, an ethylene-propylene-butene copolymer rubber, an ethylene-1-butene copolymer rubber, an ethylene-propylene-non-conjugated diene copolymer rubber, an ethylene-propylene-1-butene-non-conjugated diene copolymer rubber and an ethylene-propylene-1-butene-non-conjugated diene copolymer rubber. The ethylene-α-olefin copolymer rubber is a lowly crystalline or non-crystalline elastomer having a crystallization degree of not larger than 20%, preferably not larger than 10%.

As examples of the non-conjugated diene, there can be mentioned dicyclopentadiene, 1,4-hexadiene cyclooctadiene, methylenenorbornene and 5-ethylidene-2-norbornene. Preferable ethylene-α-olefin copolymer rubbers contain dicyclopentadiene or 5-ethylidene-2-norbornene as the third monomer units.

In the ethylene-α-olefin-non-conjugated diene copolymer rubber, the ratio of ethylene units/α-olefin units is usually in the range of 50/50 to 90/10 by mole, preferably 60/40 to 84/16 by mole, and the ratio of (ethylene+α-olefin) units/non-conjugated diene units is usually in the range of 98/2 to 90/10 by moler preferably 97/3 to 94/6 by mole. The ethylene-α-olefin-non-conjugated diene copolymer rubber usually has a Mooney viscosity ($ML_4$, 100° C.) of 10 to 180, preferably 40 to 140, and preferably has an iodine value of not larger than 20.

(6) Acrylic Acid Ester Copolymer Rubber (Acrylic Rubber ACM)

The acrylic acid ester copolymer rubber used is a copolymer rubber comprising at least 80% by mole of (i) alkyl acrylate units, the alkyl group of which has not larger than B carbon atoms, such as methyl acrylate, ethyl. Acrylate and propyl acrylate, and/or (ii) alkoxyalkyl acrylate units, the alkoxyalkyl group of which has not larger than 8 carbon atoms, such as methoxymethyl acrylate.

As monomers copolymerized with the alkyl acrylate and/or the alkoxyalkyl acrylate, there can be mentioned aromatic vinyl monomers such as styrene, α-methylstyrene and vinylpyridine; fluorine-containing vinyl monomers such as fluoroalkyl vinyl ethers, for example, fluoroethyl vinyl ether, fluoropropyl vinyl ether, trifluoromethyl vinyl ethers trifluoroethyl vinyl ether, perfluoropropyl vinyl ether and perfluorohexyl vinyl ether, o- or p-trifluoromethylstyrene, vinyl pentafluorobenzoate, difluoroethylene and tetrafluoroethylene; unsaturated monocarboxylic acids such as acrylic acid and methacrylic acid, unsaturated dicarboxylic acids such as itaconic acid, fumaric acid and maleic acid, and anhydrides thereof; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate.

Other monomers which are usually used as a crosslinking monomer for the preparation of acrylic acid ester copolymer rubbers can be used. As specific examples of such monomers, there can be mentioned active chlorine-containing unsaturated monomers such as vinyl chloroacetate, allyl chloroacetate, vinylbenzyl chloride, chloromethyl vinyl ketone and 5-chloromethyl-2-norbornene; inactive chlorine-containing unsaturated monomers such as 2-chloroethyl vinyl ether; and epoxy group-containing unsaturated monomers such as glycidyl acrylate, glycidyl methacrylate, allyl glycidyl ether and vinyl glycidyl ether. Other crosslinking monomers such as carboxyl group-containing monomers can also be used.

Unsaturated compounds having at least two carbon-carbon double bonds, one of which functions as a crosslinking ingredient for copolymerization with acrylate monomers, can also be used as a crosslinking monomers. Such unsaturated compounds include, for example, butadiene, 2-butenyl acrylate, tetrahydro benzyl acrylate, allyl acrylate, triallyl isocyanurate and divinylbenzene.

The polyacrylic acid ester copolymer rubber preferably has a Mooney viscosity $ML_4$ of 10 to 90. If the viscosity is too low, the strength of a coating is reduced when the rubber composition is used for coating a roll. In contrast, if the viscosity is too high, the extrusion shapability becomes poor.

(7) Epichlorohydrin Rubber

The epichlorohydrin rubber used is a copolymer rubber comprising at least 10% by mole of epichlorohydrin units, not larger than 90% by mole of an alkylene oxide units and not larger than 15% by mole of an unsaturated epoxide units.

As specific examples of the alkylene oxide, there can be mentioned ethylene oxide and propylene oxide. The copolymerization ratio of the alkylene oxide is not larger than 90% by mole, preferably not larger than 60% by mole. If the copolymerization ratio exceeds 90% by mole, the hygroscopicity increases and the environmental dependence of the specific volume resistance increases. By changing the copolymerization ratio of the alkylene oxide, the specific volume resistance can be controlled.

As specific example of the unsaturated epoxide, there can be mentioned allyl glycidyl ether, glycidyl methacrylate, glycidyl acrylate and butadiene monooxide. The copolymerization ratio of the unsaturated epoxide is not larger than 15% by mole. If the copolymerization ratio exceeds 15% by mole, deterioration due to thermal hardening occurs and thus, the rubber elasticity decreases and the rubber vulcanizate becomes brittle.

The epichlorohydrin copolymer rubber is classified into two types. The first type generally comprises 35 to 98% by mole of epichlorohydrin units, not larger than 60% of ethylene oxide units and not larger than 15% by mole of unsaturated epoxide units. As specific examples of the first type epichlorohydrin copolymer rubber, there can be mentioned an epichlorohydrin-allyl glycidyl ether copolymer rubber and an epichlorohydrin-ethylene oxide-allyl glycidyl ether copolymer rubber. The second type generally comprises 10 to 60% by mole of epichlohydrin units, 30 to 90% by mole of propylene oxide units or a combination of propylene oxide units with ethylene oxide units (the ratio of propylene oxide to ethylene oxide is preferably at least 1) and not larger than 15% by mole of allyl glycidyl ether. As specific examples of the second type epichlorohydrin copolymer rubber, there can be mentioned an epichlorohydrin-propylene oxide-allyl glycidyl ether copolymer rubber and an epichlorohydrin-propylene oxide-ethylene oxide-allyl glycidyl ether copolymer rubber.

Generally, the epichlorohydrin rubber has a Mooney viscosity ($ML_4$, 100° C.) of 20 to 200, preferably 50 to 100.

The epichlorohydrin rubber can be produced by a known solution polymerization procedure described in, for example, Japanese Examined Patent Publication (abbreviated to "JP-B") No. S56-51171 wherein an organic aluminum compound is used as a catalyst, but the polymerization procedure employed is not limited thereto.

Metal Salt of $\alpha,\beta$-Ethylenically Unsaturated Carboxylic Acid

The metal salt of $\alpha,\beta$-ethylenically unsaturated carboxylic acid contained in the rubber composition with a reduced heat build-up of the invention can be either (i) that which has been incorporated in the form of a metal carboxylate salt in a nitrile group-containing highly saturated copolymer rubber or other elastomers capable of being crosslinked by an organic peroxide crosslinking agent, or (ii) that which has been produced in situ within the rubber composition by a procedure wherein $\alpha,\beta$-ethylenically unsaturated carboxylic acid and a metal compound are incorporated in an elastomer capable of being crosslinked by an organic peroxide crosslinking agent, and then are reacted with each other.

The metal compound used is not particularly limited provided that the metal is capable of reacting with $\alpha,\beta$-ethylenically unsaturated carboxylic acid to form a salt with the carboxylic acid. Among others, compounds of zinc, aluminum, magnesium and calcium are usually used. The metal compound can be in the form of an oxide, a hydroxide or a peroxide. Among the metal compounds zinc compounds are preferable, which include, for example, zinc oxide, zinc carbonate and zinc hydroxide.

As specific examples of the $\alpha,\beta$-unsaturated carboxylic acid, there can be mentioned unsaturated mono-carboxylic acids such as acrylic acid, methacrylic acid, crotonic acid and 3-butanoic acid; unsaturated dicarboxylic acids such as maleic acid, fumaric acid and itaconic acid; monoesters of an unsaturated dicarboxylic acid such as mono-methyl maleate, monomethyl fumarate and monomethyl itaconate; unsaturated polyfunctional carboxylic acids other than those recited above; and esters of an unsaturated polyfunctional carboxylic acid which ester has at least one free carboxyl group, of these methacrylic acid is especially preferable because the vulcanizate has good properties and methacrylic acid is readily available.

In the case where a metal compound and an $\alpha,\beta$-ethylenically unsaturated carboxylic acid are incorporated in an elastomer capable of being crosslinked by an organic peroxide crosslinking agent and the two ingredients are reacted with each other in situ in the copolymer rubber composition to form a metal salt of an $\alpha,\beta$-ethylenically unsaturated carboxylic acid, it is preferable for improving tensile strength and other strengths of the rubber vulcanizate to use a metal compound in the form of particles from which coarse particles having a diameter of 20 µm or larger have previously removed by classification to an extent such that the content of the coarse particles in the metal compound particles used is not larger than 5% by weight. Also, in the case where a metal salt of an $\alpha,\beta$-ethylanically unsaturated carboxylic acid is incorporated in the copolymer rubber composition, it is preferable that the metal carboxylate incorporated is in the form of particles from which coarse particles of the metal carboxylate have been removed in a similar manner.

The ratio of the α,β-ethylenically unsaturated carboxylic acid to the metal compound is usually in the range of 1/0.5 to 1/3.2 by mole, preferably 1/0.5 to 1/2.5 by mole, which are calculated on the basis of the molecular weights.

The amount of the metal salt of an α,β-ethylenically unsaturated carboxylic acid is in the range of 10 to 150 parts by weight, preferably 10 to 100 parts by weight, based on 100 parts by weight of the elastomer capable of being crosslinked by an organic peroxide crosslinking agent.

Magnesium Oxide

The rubber composition with a reduced heat build-up of the invention is characterized as containing magnesium oxide having a BET specific surface area not larger than 25 $m^2/g$. The magnesium oxide is particles having a relatively large diameter, usually an average particle diameter of at least about 1 $\mu$m.

The magnesium oxide having a small specific surface area and a large average particle diameter includes, for example, (i) high-temperature burned (i.e., dead-burned) magnesium oxide which is prepared by burning at a temperature of at least about 1,000° C. and which includes generally fused magnesia used as refractory cement material for a sheathed heater, a converter and an electric furnaces and magnesia clinker for a refractory product, and (ii) low-temperature burned (i.e., soft-burned) magnesium oxide which is prepared by burning at a relatively low temperature of not higher than about 1,000° C. but at least about 800° C. and which includes high-purity magnesia used for synthetic rubbers, synthetic resins, flat rolled silicon steel sheets, medicines, ceramics and magnesia wheels. In general magnesium oxide widely used in the rubber industry has a large specific surface area, a small particle diameter and a relatively high activity, and cannot be used for the rubber composition with a reduced heat build-up of the invention.

Magnesium oxide having a BET specific surface area of larger than 25 $m^2/g$ cannot be used for the preparation of a rubber composition with a reduced heat build-up as intended by the present invention. The BET specific surface area is preferably not larger than 20 $m^2/g$ and the average particle diameter is usually at least about 5 $\mu$m, The amount of the magnesium oxide having a large specific surface area and a small average particle diameter is 5 to 100 parts by weight, preferably 10 to 80 parts by weight, based on 100 parts by weight of the elastomer capable of being crosslinked by an organic peroxide crosslinking agent. If the amount of the magnesium oxide is too small, the heat build-up of the rubber vulcanizate is not sufficiently low. In contrast if the amount of the magnesium oxide is too large, the hardness of the rubber vulcanizate is undesirably high.

Organic Peroxide Crosslinking Agent

The organic peroxide crosslinking agent used in the invention can be chosen from those which are conventionally used for peroxide-crosslinking rubbers, and are not particularly limited. As specific examples of the organic peroxide crosslinking agent, there can be mentioned dicumyl peroxide, di-tert-butyl peroxide, tert-butylcumyl peroxide, benzoyl peroxide, 2,5-dimethyl-2,5-di(tert-btuylperoxy)-hexyne-3,2,5-dimethyl-2,5-di(benzoylperoxy) hexyne and α,α'-bis(tert-butylperoxy-m-isopropyl)benzene. These organic peroxides are used in an amount of 0.1 to 30 parts by weight, preferably 0.5 to 20 parts by weight, based on 100 parts by weight of the nitrile group-containing highly saturated copolymer rubber or other elastomers.

A crosslinking aid can be used. As the crosslinking aid, there can be mentioned unsaturated compounds ordinarily used as a crosslinking aid for organic peroxide crosslinking, which include, for example, ethylene glycol dimethacrylate, trimethylolpropane trimethacrylate, N,N'-m-phenylenedimaleimide and triallyl isocyanurate, of these triallyl isocyanurate is preferable because of good properties of the rubber vulcanizate. The amount of the crosslinking aid is in the range of 0.1 to 15 parts by weight based on 100 parts by weight of the copolymer rubber.

Other components ordinarily used in the rubber industry can be incorporated in the rubber composition with a reduced heat build-up of the invention, according to the need. Such components include, for example, reinforcers such as silica and talc; fillers such as calcium carbonate and clay; processing aids; plasticizers such as phthalic acid esters, monobasic fatty acid esters, dibasic fatty acid esters and dihydric alcohol esters; processing oils; anti-oxidants; and antiozonants.

The process for preparing the rubber composition with a reduced heat build-up of the invention is not particularly limited. Usually, an elastomer capable of being crosslinked with an organic peroxide, magnesium oxide, an organic peroxide crosslinking agent and other components are mixed and kneaded together by using a mixer such as a roll and a Banbury mixer. More specifically, in a preferable preparation process, an elastomer capable of being crosslinked with an organic peroxides a zinc compound; α,β-ethylenically unsaturated carboxylic acid, magnesium oxide and other optional ingredients are usually kneaded together by using, for example, a roll, a Banbury mixer, a kneader or a twin-screw extruder, and then an organic peroxide crosslinking agent is incorporated and kneaded together at a temperature lower than the decomposition temperature of the crosslinking agent. The thus-prepared rubber composition is shaped into a desired shape and heated for crosslinking.

The hardness of the shaped vulcanizate of the rubber composition with a reduced heat build-up of the invention is not particularly limited, and can be usually in the range of 100 to 50, preferably 90 to 60 as JIS-A hardness, and in the range of 70 to 40, preferably 65 to 55 as Shore-D hardness. The hardness can be controlled by varying the proportion of (a) an elastomer capable of being crosslinked with an organic peroxide, (b) a metal salt of an α,β-unsaturated carboxylic acid and (c) magnesium oxide. Namely, when the relative amount of elastomer component (a) to component (b) and component (c) is increased, the hardness of the vulcanizate is reduced. In contrast, when the relative amount of elastomer component (a) is decreased, the hardness of the vulcanizate is enhanced.

When a relatively large amount of an elastomer (a) capable of being crosslinked with an organic peroxide is incorporated for obtaining a shaped rubber vulcanizate with a low hardness, the entire amount, of elastomer component (a) can be kneaded together with component (b) and component (b), but preferably, a part of elastomer component (a) is first kneaded together with component (b) and component (c) and then the remainder of elastomer component (a) is added. For obtaining a shaped rubber vulcanizate with a low hardness, an elastomer other than the elastomer (a) capable of being crosslinked with an organic peroxide can be additionally incorporated. However, the elastomer additionally incorporated is preferably of the same type as the elastomer component (a) kneaded together with component (b) and component (c) in the first step in view of the compatibility between the two elastomers and the mechanical strength of the shaped rubber vulcanizate, Especially it is preferable that the elastomer additionally incorporated is of the same as elastomer component (a) used in the first step. For example, when a nitrile group-containing highly saturated copolymer rubber is used in the first step, a nitrile group-containing highly saturated copolymer rubber is preferably incorporated in the second step. Most preferably exactly the same nitrile group-containing highly saturated copolymer rubber as that used in the first step is incorporated in the second step.

When the elastomer component is incorporated in lots as described above, a procedure of adding the respective components in the following order can be employed, namely, (i) a part of the elastomer component, component (b), component (c) and component (d) (organic peroxide crosslinking agent) are first kneaded and then the remainder of the elastomer component is incorporated; or (ii) a part of the elastomer component, component (b) and component (c) are first kneaded, then the remainder of the elastomer component is incorporated and kneaded, and finally component (d) (organic peroxide crosslinking agent) is incorporated. The last procedure is preferable.

The merits of the rubber composition with a reduced heat build-up of the invention are remarkably manifested when it is made into rubber articles such that heat is readily built up when distorted by shear or compression. As specific examples of the rubber article, there can be mentioned rolls, belts, seals including a rotary seal and a peristaltic seal, tires, vibration insulators and hoses. The merits of the rubber composition with a reduced heat build-up of the invention are most remarkably manifested when it is made into rubber articles which is used under a high load such as steel-making rolls or paper-making rolls.

When the rubber composition of the invention is made into a roll, at least the surface portion of the roll is composed of the rubber composition of the invention. Namely, the entirety of roll may be made of the rubber composition of the invention, or the outer peripheral of a roll mandrel may be lined with the rubber composition of the invention, Rubber rolls such as steel-making rolls and paper-making rolls can be made by a process wherein a vulcanizable rubber composition is calendar to form a rubber sheet, and the rubber sheet is spirally wrapped around a mandrel; a process wherein a mandrel is lined with a rubber composition by extruding the composition through an extruder equipped with a cross head; an unvulcanized rubber is extruded into a thick tape and the tape is immediately spirally wrapped around a mandrel; and a process wherein a mandrel is covered with a rubber composition by a transfer or injection molding procedure using a cylindrical mold. The vulcanizable rubber composition wrapped around the mandrel is crosslinked by, for example, steam heating, hot air heating, hot water heating, mold heating or induction heating.

The invention will now be specifically described by the following examples. In the following examples, comparative examples and reference examples, parts and % are by weight unless otherwise specified.

(1) Evaluation of Physical Properties of Rubber Vulcanizate

According to Japanese Industrial Standard (JIS) K6301 and the recipe shown in Table 1, vulcanizable rubber compositions were prepared and kneaded at a temperature of 50° C. and then crosslinked at a temperature of 170° C. for 30 minutes to prepare sheets having a thickness of 2 mm. Each sheet was blanked into a #3 dumbbell-shaped specimen. Tensile strength (kgf/cm$^2$) and elongation (%) were tested. Further, hardness was tested by using a JIS spring type A hardness tester.

(2) Heat Build-up Test

To a testing specimen having a columnar shape with a diameter of 25 mm and a height of 25 mm, a predetermined static load is applied by using a hydraulic servo-controlled tester, and then a dynamic load with a predetermined frequency is applied whereby the specimen is subjected to a compressive fatigue. The surface temperature (° C.) of the thus-heat built up specimen is measured by an infrared radiation thermometer (thermo-tracer) and the highest temperature is recorded. When the specimen is failed within 30 minutes from the commencement of measurement, the time (minutes) spanning from the commencement of measurement to the occurrence of failure is measured. Specimens which are not failed within the stated period of time are evaluated as being acceptable in reduced heat build-up, and, among the acceptable specimens, those which exhibit a low highest-surface-temperature are evaluated as being excellent in reduced heat build-up, The measuring conditions (i.e., static load, dynamic load and frequency) employed are as follows. For nitrite group-containing highly saturated copolymer rubbers (HNBR) (Examples 1 to 7, Comparative Examples 1 to 5) and nitrile group-containing copolymer rubbers (Nag) (Example 8, Comparative Example 6), static load is 150 kgf, and dynamic load is (static load ±140 kgf) at a frequency of 30 Hz. Namely, a static load of 150 kgf is applied to a specimen and then a dynamic load of 10 to 290 kgf is applied thereto at a frequency of 30 Hz. For the other rubbers (Examples 9 to 12, Comparative Examples 7 to 10), static load is 110 kgf and dynamic load is (static load ±100 kgf) at a frequency of 30 Hz.

EXAMPLES 1–8, COMPARATIVE EXAMPLES 1–6

Elastomer Capable of Being Crosslinked by Organic Peroxide (1) Nitrile group-containing highly saturated copolymer rubber (HNBR) (hydrogenation product of an acrylonitrile-butadiene copolymer rubber, "zetpol 2020" supplied by Nippon Zeon Co., bound acrylonitrile content: 36%, iodine value 28)

(2) Nitrile group-containing copolymer rubber (NBR) (an acrylonitrile-butadiene copolymer rubber, "DN108" supplied by Nippon Zeon Co., bound acrylonitrile content: 38%, Mooney viscosity (ML$_4$, 100° C.): 65)

Magnesium Oxide (1) MgO-1: BET specific surface area: 0.5 to 1.5 m$^2$/g, average particle diameter: 13 μm (fused magnesia for ceramics, "KMAOH-F" supplied by Tateho Chem. Ind. Co.)

(2) MgO-2: BET specific surface area: 0.5 to 1.5 m$^2$/g, average particle diameter: 10 μm (high-purity fused magnesia, "SSP#3" supplied by Tateho Chem. Ind. Co.)

(3) MgO-3: BET specific surface area: 15 m$^2$/g, average particle diameter: 1.5 μm (high-purity fused magnesia, "HP-10N" supplied by Konoshima Chem. Co.)

(4) MgO-4: BET specific surface area: 145 m$^2$/g, average particle diameter: 3.5 μm (magnesia, "Starmag U" supplied by Konoshima Chem. Co.)

To HNBR or NBR, the above-listed magnesium oxide and components shown in Table 1 were incorporated, and the mixture was kneaded at a temperature of 50° C. to prepare a vulcanizable rubber composition. Physical properties and heat build-up of a vulcanizate of the rubber composition were evaluated. The results are shown in Table 1.

TABLE 1

|  | Example | | | | | | | | Comparative Example | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| Composition (wt. parts) | | | | | | | | | | | | | | |
| HNBR | 100 | 100 | 100 | 100 | 100 | 100 | 100 | — | 100 | 100 | 100 | 100 | 100 | — |
| NBR | — | — | — | — | — | — | — | 100 | — | — | — | — | — | 100 |
| Zinc methacrylate *1 | 60 | 60 | 60 | 30 | 80 | 60 | 60 | 40 | 60 | 60 | 60 | — | 60 | 40 |
| MgO-1 | 15 | 30 | 50 | 30 | 30 | — | — | 30 | — | — | — | 30 | — | — |
| MgO-2 | — | — | — | — | — | 30 | — | — | — | — | — | — | — | — |
| MgO-3 | — | — | — | — | — | — | 30 | — | — | — | — | — | — | — |
| MgO-4 | — | — | — | — | — | — | — | — | — | 30 | — | — | — | — |
| ZnO | — | — | — | — | — | — | — | — | — | — | — | — | 30 | — |
| HAF carbon | — | — | — | 40 | — | — | — | — | — | 5 | — | 80 | — | — |
| Plasticizer *2 | — | — | — | — | 10 | — | — | — | — | — | — | — | — | — |
| Peroxide *3 | 5 | 5 | 5 | 5 | 5 | 5 | 5 | 3 | 5 | 5 | 5 | 5 | 5 | 3 |
| AO 445 *4 | 1.5 | 1.5 | 1.5 | 1.5 | 1.5 | 1.5 | 1.5 | 1.5 | 1.5 | 1.5 | 1.5 | 1.5 | 1.5 | 1.5 |
| Physical properties of vulcanizate | | | | | | | | | | | | | | |
| Hardness (JIS-A) | 90 | 92 | 93 | 92 | 91 | 91 | 92 | 91 | 89 | 92 | 94 | 90 | 91 | 90 |
| Tensile strength (kgf/cm$^2$) | 381 | 365 | 337 | 296 | 353 | 339 | 358 | 248 | 404 | 376 | 311 | 286 | 393 | 263 |
| Elongation (%) | 280 | 240 | 220 | 310 | 220 | 220 | 230 | 150 | 296 | 270 | 220 | 160 | 290 | 170 |
| Heat build-up | | | | | | | | | | | | | | |
| Time to failure (min) | ND | ND | ND | ND | ND | ND | ND | ND | 15.2 | 16.2 | 14.8 | 10.6 | 19.2 | 8.6 |
| Highest temperature (° C.) | 152 | 116 | 73 | 183 | 119 | 121 | 131 | 235 | >300 | >300 | >300 | >300 | >300 | >300 |

Note:
*1 "Hi-cross ZT" supplied by Seiko Chem. Co.
*2 Tri-(2-ethylhexyl)trimeilitate ("Adekacizer C-8")
*3 1,3-Bis(tert-butylperoxyisopropyl)benzene, purity: 40%, "Vul-cup 40KE"
*4 Antioxidant "Nauguard 445", substituted diphenylamine
*5 ND: not failed

EXAMPLES 9–12, COMPARATIVE EXAMPLES 7–10

Elastomer Capable of Being Crosslinked by Organic Peroxide (3) Styrene-butadiene copolymer rubber (SBR) ("Nipol NS-210" supplied by Nippon Zeon Co., bound styrene content: 25%, Mooney viscosity (ML$_4$, 100° C.) 56)
(4) Polybutadiene rubber (BR) ("Nipol BR-120" supplied by Nippon Zeon Co., Mooney viscosity (ML$_4$, 100° C.) 44)
(5) Natural rubber (NR) (RRS#3)
(6) Ethylene-propylene-dicyclopentadiene copolymer rubber (EPDM) (1070 supplied by Mitsui Petrochem. Co., ethylene content: 58%, dicyclopentadiene content: 5.2%, Mooney viscosity (ML$_4$, 100° C.) 67)

Magnesium Oxide
(1) MgO-1: BET specific surface area: 0.5 to 1.5 m$^2$/g, average particle diameter: 13 μm (fused magnesia for ceramics, "KMAOH-F" supplied by Tateho Chem. Ind. Co.)

To the above-mentioned SBR, BR, NR or EPDM as an elastomer, components shown in Table 2 were incorporated, and the mixture was kneaded at a temperature of 50° C. to prepare a vulcanizable rubber composition. Physical properties and heat build-up of a vulcanizate of the rubber composition were evaluated. The results are shown in Table 2.

TABLE 2

|  | Example | | | | Comparative Example | | | |
| --- | --- | --- | --- | --- | --- | --- | --- | --- |
|  | 9 | 10 | 11 | 12 | 7 | 8 | 9 | 10 |
| Composition (wt. parts) | | | | | | | | |
| SBR | 100 | — | — | — | 100 | — | — | — |
| BR | — | 100 | — | — | — | 100 | — | — |
| NR | — | — | 100 | — | — | — | 100 | — |
| EPDM | — | — | — | 100 | — | — | — | 100 |
| Zinc methacrylate *1 | 30 | 30 | 50 | 60 | 30 | 30 | 50 | 60 |
| MgO-1 | 30 | 30 | 30 | 30 | — | — | — | — |
| Peroxide *2 | 2 | 2 | 5 | 5 | 2 | 2 | 2 | 5 |
| AO 445 *3 | 1.5 | 1.5 | 1.5 | 1.5 | 1.5 | 1.5 | 1.5 | 1.5 |
| Physical properties of vulcanizate | | | | | | | | |
| Hardness (JIS-A) | 92 | 91 | 91 | 92 | 92 | 91 | 92 | 91 |
| Tensile strength (kgf/cm$^2$) | 183 | 198 | 263 | 176 | 358 | 248 | 183 | 198 |
| Elongation (%) | 200 | 140 | 230 | 150 | 230 | 150 | 200 | 140 |

TABLE 2-continued

|  | Example | | | | Comparative Example | | | |
|---|---|---|---|---|---|---|---|---|
|  | 9 | 10 | 11 | 12 | 7 | 8 | 9 | 10 |
| Heat build-up | | | | | | | | |
| Time to failure (min) | ND | ND | ND | ND | 16.4 | 10.2 | 12.3 | 21.6 |
| Highest temperature (° C.) | 153 | 197 | 186 | 138 | >300 | >300 | >300 | >300 |

Note:
*1 "Hi-cross ZT" supplied by Seiko Chem. Co.
*2 1,3-Bis(tert-butylperoxyisopropyl)benzene, purity: 40%, "Vul-cup 40KE"
*3 Antioxidant "Nauguard 445", substituted diphenylamine
*4 ND: not failed

EXAMPLES 13–16

Using the same nitrile group-containing highly saturated copolymer rubber (HNBR) as that used in Examples 1–3 as an elastomer cable of being crosslinked by an organic peroxide, a mixture (I) was prepared by mixing HNBR with other components according to the following composition.

| Composition | HNBR | 100 parts |
|---|---|---|
|  | Methacrylic acid | 38 parts |
|  | ZnO | 22 parts |
|  | MgO | 50 parts |

The mixture (I) was prepared as follows. Namely, HNBR, ZnO and methacrylic acid were added in this order to a 6-inch open roll and kneaded at a temperature of 100 to 150° C. for 8 minutes whereby zinc methacrylate salt was produced in situ. Then MgO was added and kneading was conducted further for 3 minutes to obtain mixture (I).

Then HNBR was additionally incorporated into mixture (I) to prepare a mixture (II). An organic peroxide and AO445 [antioxidant, 1,3-bis(tert-butylperoxyisopropyl)-benzene, purity: 40%, "Vul-cup 40KE"] were additionally incorporated in mixture (II) to obtain a rubber composition with a reduced heat build-up.

The mixing ratio of mixture (I) with the additional HNBR was as follows.

| Example No. | 13 | 14 | 15 | 16 |
|---|---|---|---|---|
| Mixture (I) (wt. %) | 85 | 65 | 50 | 30 |
| Additional HNBR (wt. %) | 15 | 35 | 50 | 70 |

The rubber composition with a reduced heat build-up was prepared from mixture (II) as follows. Using a 6-inch open roll, mixture (I), the additional HNBP (the sum of mixture (I) plus the additional HNBR was 100 parts), an organic peroxide [tri-(2-ethylhexyl) trimeilitate (ADK Sizer C-8)] 5 parts and AO445 1.5 parts were added in this order and kneaded for 5 minutes at a temperature at which the organic peroxide is incapable of being decomposed i.e., at a temperature of room temperature to 60° C. to prepare a vulcanizable rubber composition. Physical properties and heat build-up of a vulcanizate of the rubber composition were evaluated. The results are shown in Table 3.

TABLE 3

|  | Example | | | |
|---|---|---|---|---|
|  | 13 | 14 | 15 | 16 |
| Composition A (wt. parts) | | | | |
| Mixture (II) comprising | 100 | 100 | 100 | 100 |
| Mixture I | (85) | (65) | (50) | (30) |
| Additional HNBR | (15) | (35) | (50) | (70) |
| Peroxide | 5 | 5 | 5 | 5 |
| AO 445 | 1.5 | 1.5 | 1.5 | 1.5 |
| Composition B (wt. parts) | | | | |
| HNBR | 100 | 100 | 100 | 100 |
| Zinc methacrylate | 44.5 | 28.2 | 19.4 | 10.2 |
| MgO-1 | 36.4 | 23.5 | 16.1 | 8.4 |
| Peroxide | 9 | 7.6 | 6.8 | 5.9 |
| AO 445 | 2.7 | 2.3 | 2.0 | 1.8 |
| Physical properties of vulcanizate | | | | |
| Hardness (JIS-A) | 83 | 72 | 65 | 57 |
| Tensile strength (kgf/cm$^2$) | 412 | 482 | 456 | 341 |
| Elongation (%) | 360 | 430 | 480 | 510 |
| Heat build-up | | | | |
| Time to failure (min) | ND | ND | 36.2 | 27.8 |
| Highest temperature (° C.) | 100 | 140 | 205 | 240 |

In composition A, the amounts of the respective components were expressed as parts by weight based on 100 parts by weight of the above-mentioned mixture (II). In composition B, the amounts of the respective components were expressed as parts by weight based on 100 parts by weight of the rubber component (HNBR).

Industrial Applicability

The rubber composition of the invention, which comprises an elastomer capable of being crosslinked by an organic peroxide, a metal salt of an α,β-ethylenically unsaturated carboxylic acid and magnesium oxide having a small specific surface area and a large average particle diameter, exhibits a greatly reduced heat build-up under a high load as compared with (i) a rubber composition having incorporated therein a metal salt of an α,β-ethylenically unsaturated carboxylic acid, but riot incorporated therein magnesium oxide having a small specific surface area and a large average particle diameter, or (ii) a rubber composition having incorporated therein a metal salt of an α,β-ethylenically unsaturated carboxylic acid and magnesium oxide having a large specific surface area and a small average particle diameter which is conventionally used in the rubber industry. In other words the rubber composition of the invention is characterized, by the incorporation of magnesium oxide having a small specific surface area and a large average particle diameter, in that the strength is maintained in a high level without undesirably large increase of hardness and reduction of elongation, and a very low heat build-up is exhibited under a high load.

Therefore, the rubber composition of the invention is used for rubber articles, in which heat is readily built up when they are subjected to shear or compression, and which include, for example, rolls, belts, seals tires, vibration insulators and hoses, especially, when the rubber composition is used for steel-making rolls or paper-making rolls which are used under a high load, the merits of reduced heat build-up are most prominently manifested,

What is claimed is:

1. A rubber composition having a reduced heat build-up, which comprises:
   (a) 100 parts by weight of an elastomer crosslinkable under curing conditions by an organic peroxide crosslinking agent,
   (b) 10 to 150 parts by weight of a metal salt of an α,β-ethylenically unsaturated carboxylic acid,
   (c) 5 to 100 parts by weight of magnesium oxide having a specific surface area as determined by the Brunauer-Emmett-Teller equation of not larger than 25 m$^2$/g, and
   (d) 0.1 to 30 parts by weight of an organic peroxide crosslinking agent.

2. The rubber composition according to claim 1, wherein the elastomer is at least one elastomer selected from the group consisting of an unsaturated nitrile-conjugated diene copolymer rubber and a hydrogenation product thereof, a polybutadiene rubber, a polyisoprene rubber, natural rubber, an aromatic vinyl compound-conjugated diene copolymer rubber, an ethylene-α-olefin copolymer rubber, an acrylic acid ester copolymer rubber and epichlorohydrin copolymer rubber.

3. The rubber composition according to claim 1, wherein the elastomer is an unsaturated nitrile-conjugated diene copolymer rubber comprising 10 to 50% by weight of unsaturated nitrile units, 90 to 10% by weight of conjugated diene units and 0 to 80% by weight of copolymerizable monomer units, or a hydrogenation product thereof.

4. The rubber composition according to claim 3, wherein the unsaturated nitrile is acrylonitrile and the conjugated diene is butadiene.

5. The rubber composition according to claim 1, wherein the elastomer capable of being crosslinked by the organic peroxide crosslinking agent is a polybutadiene rubber having a Mooney viscosity of 20 to 90, and a cis-1,4 content of at least 90% or a 1,2-vinyl content of 10 to 60%.

6. The rubber composition according to claim 1, wherein the elastomer capable of being crosslinked by the organic peroxide crosslinking agent is natural rubber or a polyisoprene rubber having a cis-1,4 content of at least 90% and a Mooney viscosity of 50 to 150.

7. The rubber composition according to claim 1, wherein the elastomer capable of being crosslinked by the organic peroxide crosslinking agent is an aromatic vinyl compound-conjugated diene copolymer rubber containing 10 to 50% by weight of aromatic vinyl compound units and having a Mooney viscosity of 30 to 150.

8. The rubber composition according to claim 7, wherein the aromatic vinyl compound is styrene and the conjugated diene is butadiene.

9. The rubber composition according to claim 1, wherein the elastomer capable of being crosslinked by the organic peroxide crosslinking agent is at least one ethylene-α-olefin copolymer rubber selected from an ethylene-propylene copolymer rubber, an ethylene-propylene-butene copolymer rubber, an ethylene-butene copolymer rubber, an ethylene-propylene-non-conjugated diene copolymer rubber, an ethylene-propylene-butene-non-conjugated diene copolymer rubber and an ethylene-butene-non-conjugated diene copolymer rubber.

10. The rubber composition according to claim 1, wherein the elastomer capable of being crosslinked by the organic peroxide crosslinking agent is an acrylic acid ester copolymer rubber containing at least 80% by mole of units of at least one acrylate selected from an alkyl acrylate units, the alkyl group of which has no more than 8 carbon atoms, and an alkoxyalkyl acrylate units, the alkoxy alkyl group of which has no more than 8 carbon atoms.

11. The rubber composition according to claim 1, wherein the elastomer capable of being crosslinked by the organic peroxide crosslinking agent is an epichlorohydrin rubber containing at least 10% by mole of epichlorohydrin units, no more than 90% by mole of alkylene oxide units and not more than 15% by mole of unsaturated epoxide units.

12. The rubber composition according to claim 1, wherein the metal salt of α,β-ethylenically unsaturated carboxylic acid is produced by a procedure wherein a metal compound and an α,β-ethylenically unsaturated carboxylic acid are incorporated in the elastomer and allowed to react with each other in situ within the elastomer.

13. The rubber composition according to claim 12, wherein the ratio of the α,β-ethylenically unsaturated carboxylic acid to the metal compound is 1/0.5 to 1/3.2 by mole.

14. The rubber composition according to claim 1, wherein the metal compound or the metal salt of α,β-ethylenically unsaturated carboxylic acid, which is to be incorporated in the elastomer, contains not larger than 5% by weight of coarse particles having a particle diameter of at least 20 μm.

15. The rubber composition according to claim 1, wherein the amount of the metal salt of α,β-ethylenically unsaturated carboxylic acid is in the range of 10 to 100 parts by weight based on 100 parts by weight of the elastomer.

16. The rubber composition according to claim 1, wherein the α,β-ethylenically unsaturated carboxylic acid is methacrylic acid.

17. The rubber composition according to claim 1, wherein the metal salt of α,β-ethylenically unsaturated carboxylic acid is a salt of a metal selected from zinc, aluminum, magnesium and calcium.

18. The rubber composition according to claim 1, wherein the metal salt of α,β-ethylenically unsaturated carboxylic acid is a zinc salt.

19. The rubber composition according to claim 1, wherein the magnesium oxide has a BET specific surface area of not larger than 20 m$^2$/g.

20. The rubber composition according to claim 1, wherein the amount of magnesium oxide is in the range of 10 to 80 parts by weight based on 100 parts by weight of the elastomer.

21. The rubber composition according to claim 1, wherein the amount of the organic peroxide crosslinking agent is 0.5 to 10 parts by weight.

* * * * *